(No Model.) 3 Sheets—Sheet 1.
L. FRENNET-WAUTHIER.
MACHINE FOR HARVESTING BEETS.

No. 584,724. Patented June 15, 1897.

WITNESSES:
F. W. Wright
S. C. Connor

INVENTOR
Louis Frennet-Wauthier
BY
Howson and Howson
HIS ATTORNEYS (No Model.) 3 Sheets—Sheet 3.
L. FRENNET-WAUTHIER.
MACHINE FOR HARVESTING BEETS.
No. 584,724. Patented June 15, 1897.
FIG. 3.
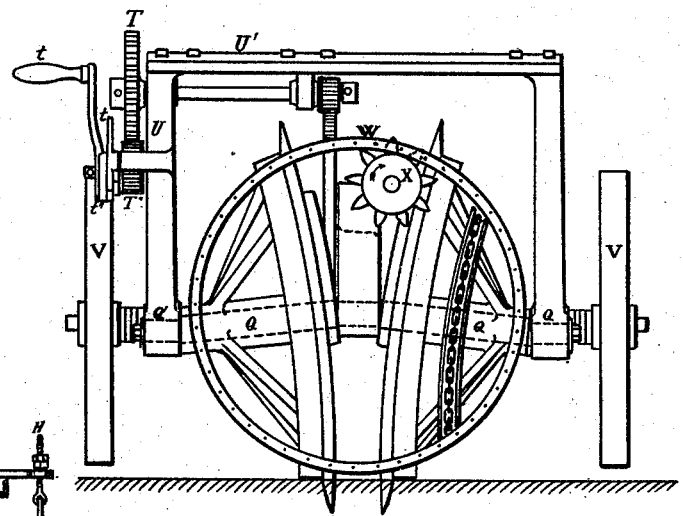
FIG. 8.
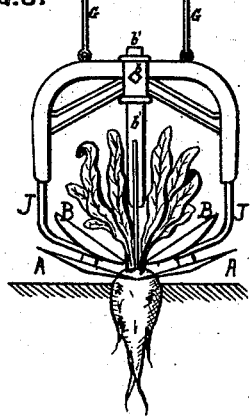
FIG. 4.
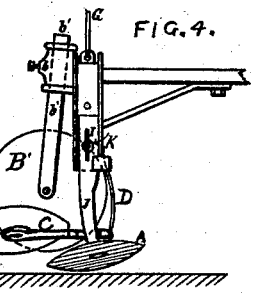
FIG. 5.
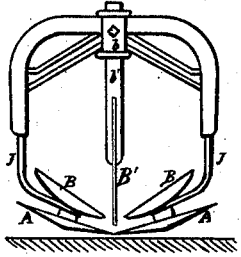
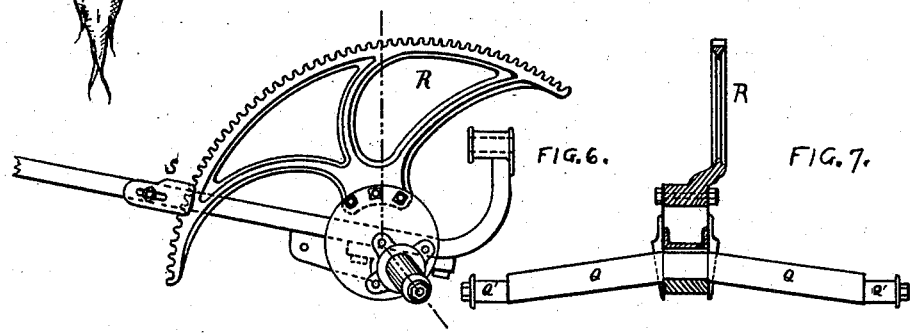
FIG. 6. FIG. 7.
-WITNESSES-
F. W. Wright
I. C. Connor
-INVENTOR-
Louis Frennet-Wauthier
-BY-
Howson and Howson
HIS ATTORNEYS-

UNITED STATES PATENT OFFICE.

LOUIS FRENNET-WAUTHIER, OF LIGNY, BELGIUM.

MACHINE FOR HARVESTING BEETS.

SPECIFICATION forming part of Letters Patent No. 584,724, dated June 15, 1897.

Application filed December 24, 1896. Serial No. 616,912. (No model.) Patented in Belgium November 27, 1895, No. 118,588, September 26, 1896, No. 123,732, and October 3, 1896, No. 123,848.

*To all whom it may concern:*

Be it known that I, LOUIS FRENNET-WAUTHIER, manufacturer, of Ligny, Belgium, have invented a Machine for Harvesting Beet-Roots, (for which I have received patents in Belgium as follows: November 27, 1895, No. 118,588; September 26, 1896, No. 123,732, and October 3, 1896, No. 123,848,) of which the following is a specification.

The machine according to this invention is arranged to effect the various operations for harvesting beet-roots—that is to say, cutting off the leaves with the upper part or crown of the root, the raising of the root from the soil, and clearing it from earth.

Figure 1:
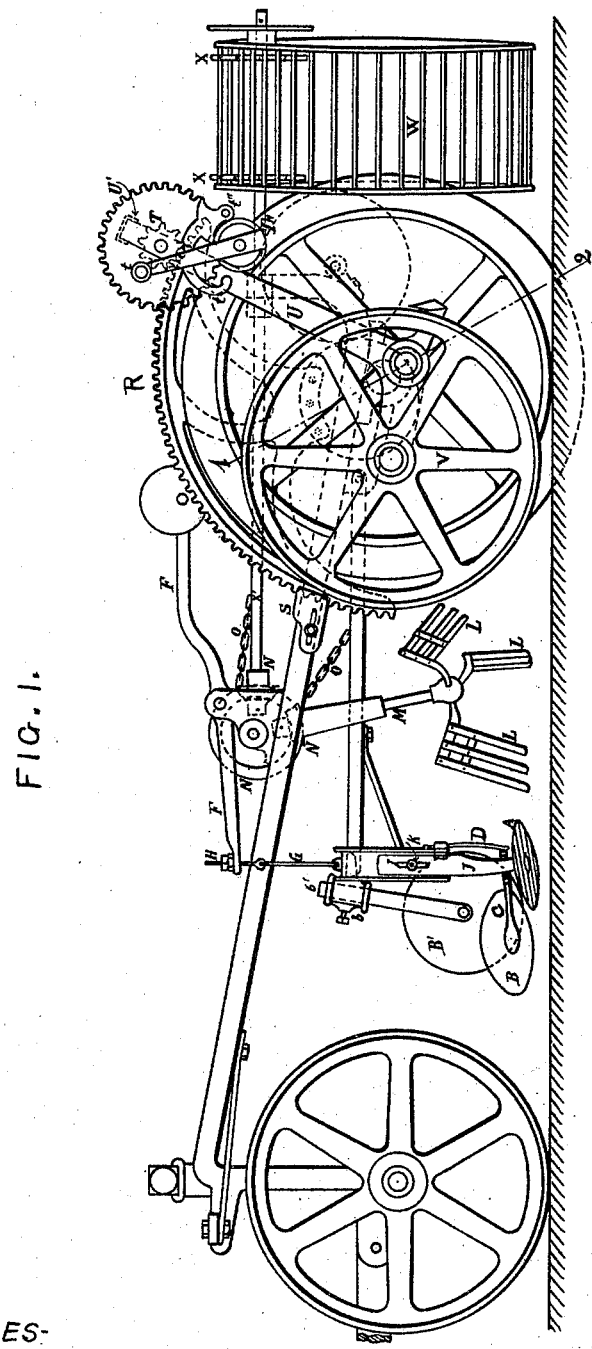
Figure 2:
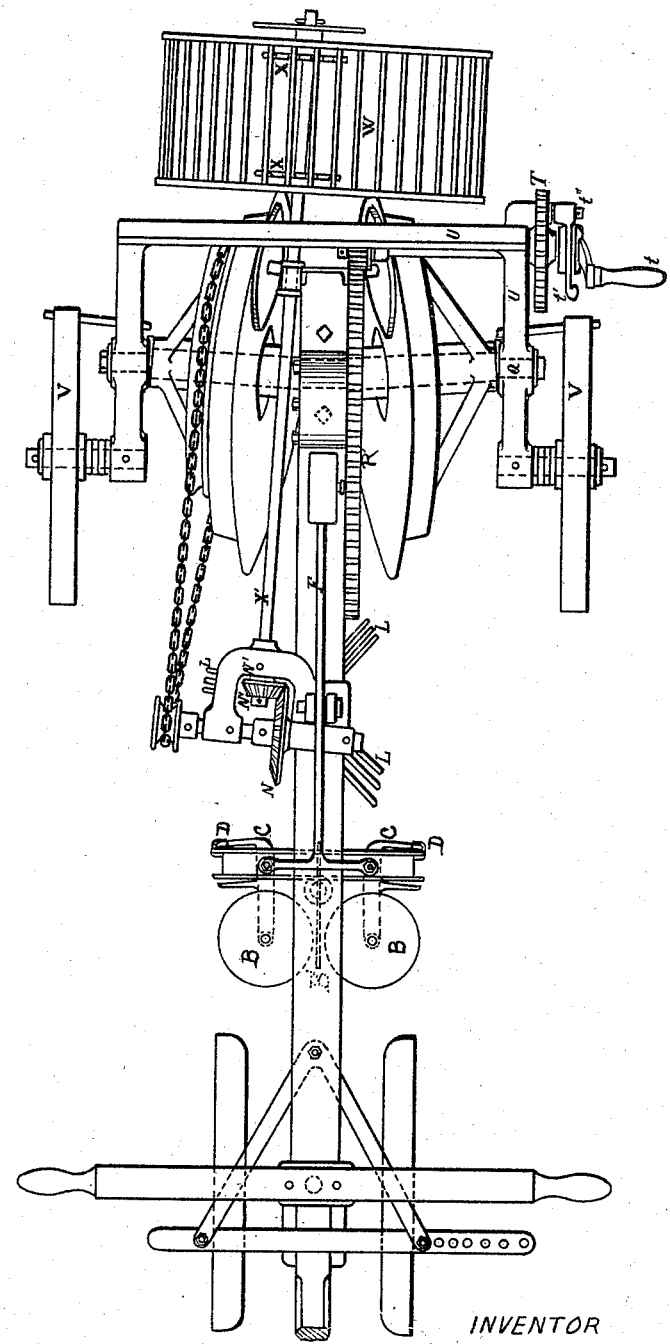

Figure 1 of the accompanying drawings is a side elevation, Fig. 2 is a plan, and Fig. 3 is an end view, of the machine. Figs. 4 and 5 are respectively side and front views showing a modified arrangement of the leaf and crown cutters. Figs. 6 and 7 show details. Fig. 8 is a front view of the leaf and crown cutters.

As mentioned above, the first operation is to cut off the crown and leaves, for which I provide two concave circular knives A A, inclined downward toward each other and also forward, so that their cutting edges meet the root to be cut in a horizontal plane. In front of these knives are two conoidal rollers B B, inclined so as to ride up the crown of the root helically till they grip the springings of the leaves, thus forming guides for the knives to cut the crown of the root at the desired height. The rollers B B are mounted on arms of rock-spindles C C and are urged by springs D D toward the middle line of the machine, being thus free to a distance apart suiting the thickness of the crown of the root.

The cutting apparatus is movable vertically, so that it can be raised or lowered to suit the greater or less height of the root-crowns above the ground. For this purpose it is suspended from a lever F by two rods or chains G, provided with adjusting-nuts H, and is balanced by a weight E. The suspenders G leave the rollers B B free to deviate to right or left to suit the position of the roots when they are not in the center line of the machine.

The height of the knives relatively to that of the guide-rollers may be varied to suit the desired level of cut. For this purpose the arms J, which carry the knives, have slots I for bolts with tightening-nuts K.

In the modification shown in Figs. 4 and 5 the rollers B B are fixed sufficiently far apart to allow passage for the largest beet-roots, serving to guide the knives laterally to right or left, as roots out of line may require.

In order to guide the knives vertically, so that they may cut at any desired level, I employ a third roller B', mounted on a rod b', which can be raised or lowered and held in a boss b. This roller B', running over the heads of the beet-roots, causes the knives to ascend or descend, according as the roots project more or less from the soil.

Behind the knives there is an appliance for throwing aside the cut-off leaves and crowns. It consists of three arms L, projecting from a spindle M, caused to revolve by bevel-gear N on the axis of a pulley p, driven by chain O from the pulley P. The arms L, striking the leaves severed from the roots, throw them to the side. The roots are then pinched between two inclined disks which raise them from the ground, as was described in the previous patent, No. 528,869, of March 1, 1894. As the closest point of the disks is in the same plane with the inclined axes, this point can be brought nearer to or farther from the lowest point by turning these inclined axes, which is effected as follows: To the axle Q, I attach a toothed segment R, which can be moved either way by hand and fixed by a toothed sliding stop S. This adjustment has to be made according to the state of the soil in respect of moisture. When it is dry, the closest point of the disks has to be raised. When the weather is wet, the closest point has to be lowered until it is at the lowest point.

I employ the toothed segment R for raising the disks out of the soil when required, as in traveling along roads. For this purpose the segment is connected by gearing T T' T" to a crank-handle t on one of the arms v, turning on the axle Q or Q' and connected to the road-wheels V. Thus if the parts are in gear with the segment R on turning the handle t and pinion T the arms v are caused to rise and the wheels V to descend until they rest on the ground, and then the disks are raised out of the soil, ceasing to work. At the same time a cross-bar $v'$, connecting the arms $v$, comes to bear on the rear end of the lever F and raises the cutting apparatus, so as not to interfere with the progress of the machine nor let the knives down during its transport. A pawl $t$ and ratchet-wheel having two sets of teeth sloped opposite ways retain the apparatus in the position to which it is moved.

At the rear of the machine I have mounted an appliance for clearing the roots from soil, consisting of a cylindrical or conical drum having its circumference made of round bars fixed at intervals apart to two side rings. It is suspended on two toothed wheels X on a side shaft X', carrying the pinion N'. The roots thrown into the drum by the inclined disks tumble over the bars, having the soil shaken off them, and are discharged at the rear.

Having thus described the nature of this invention and the best means I know of carrying the same into practical effect, I claim—

1. In a machine for harvesting beet-root, the combination of a leaf and crown cutter comprising the circular knives and two or three guide-rollers, suspended in a movable balanced frame, with revolving arms adapted to throw aside the leaves, two inclined disks adapted to uproot the plants, and an open-barred drum adapted to clear the roots of soil, substantially as described.

2. In a machine for harvesting beet-root, apparatus for cutting off the crown of the root and the leaves comprising two inclined concave circular knives having in front of them two inclined guide-rollers pressed toward each other by springs, the whole suspended free to move vertically and laterally from a lever and balanced by a counterweight, substantially as described.

3. In a machine for harvesting beet-root, apparatus for cutting off the crown of the root and the leaves comprising two inclined concave circular knives, having in front of them two laterally-guiding rollers at a fixed distance apart, and a vertically-guiding roller adjustable in height, the whole suspended free to move vertically and laterally from a counterweighted lever, substantially as described.

4. In a machine for harvesting beet-root, an appliance for throwing the cut-off leaves aside comprising arms on a rotating spindle connected by bevel-gear pulley and chain to a pulley on one of the uprooting-disks, substantially as described.

5. In a machine for harvesting beet-root, a toothed segment connected to the inclined axles of the uprooting-disks and adapted to be turned so as to vary the position of the closest point of the disks and to be fixed in position, substantially as described.

6. In a machine for harvesting beet-root, a toothed segment connected to the inclined axles of the uprooting-disks and geared to a handle mounted on the frame which carries the axles of the disks and of the road-wheels so that by turning the handle the frame is moved raising the disks out of the ground lowering the road-wheels and raising the cutting apparatus, substantially as described.

In testimony whereof I have signed my name to this specification in the presence of two subscribing witnesses.

LOUIS FRENNET-WAUTHIER.

Witnesses:
GUSTAVE PIERRE,
GREGORY PHELAN.